(12) United States Patent
Otter et al.

(10) Patent No.: US 7,475,333 B2
(45) Date of Patent: Jan. 6, 2009

(54) DEFINING FORM FORMATS WITH LAYOUT ITEMS THAT PRESENT DATA OF BUSINESS APPLICATION

(75) Inventors: Wolfgang Otter, Nussloch (DE);
Wolfgang Weiss, Wiesloch (DE);
Adrian Alexander, Walldorf (DE);
Vladislav Bezrukov, Leimen (DE);
Claudia Binder, Schwetzingen (DE);
Andreas Deutesfeld, Bad Schönborn (DE); Thomas Göring, Wiesloch (DE);
Rainer Hoch, Altlußheim (DE);
Christoph Wachter, Karlsruhe (DE)

(73) Assignee: SAP AG, Walldorf (DE)

( * ) Notice: Subject to any disclaimer, the term of this patent is extended or adjusted under 35 U.S.C. 154(b) by 695 days.

(21) Appl. No.: 09/872,515

(22) Filed: Jun. 1, 2001

(65) Prior Publication Data
US 2003/0004836 A1    Jan. 2, 2003

(51) Int. Cl.
*G06F 15/00* (2006.01)
*G06F 17/00* (2006.01)

(52) U.S. Cl. .................. 715/222; 715/243; 715/253; 715/249; 715/277

(58) Field of Classification Search ............ 715/505, 715/517, 526, 530
See application file for complete search history.

(56) References Cited

U.S. PATENT DOCUMENTS

| | | | | |
|---|---|---|---|---|
| 5,410,648 A | * | 4/1995 | Pazel ............ | 717/124 |
| 5,602,997 A | * | 2/1997 | Carpenter et al. ........ | 715/764 |
| 5,742,836 A | * | 4/1998 | Turpin et al. ......... | 715/507 |
| 5,745,712 A | * | 4/1998 | Turpin et al. ......... | 345/763 |
| 5,754,174 A | * | 5/1998 | Carpenter et al. ........ | 715/810 |
| 5,806,079 A | * | 9/1998 | Rivette et al. ......... | 715/512 |
| 5,857,034 A | | 1/1999 | Tsuchiya et al. ........ | 382/175 |
| 5,915,258 A | * | 6/1999 | Toyokura ............. | 715/505 |
| RE36,422 E | * | 11/1999 | Pazel ............... | 717/125 |
| 5,978,840 A | | 11/1999 | Nguyen et al. | |
| 6,157,924 A | | 12/2000 | Austin | |

(Continued)

FOREIGN PATENT DOCUMENTS

DE    4216893 C2    11/1992

(Continued)

OTHER PUBLICATIONS

"SAP Smart Forms (BC-SRV-SCR)", Release 46D, SAP Online Help, 2000, 73 pages.

(Continued)

*Primary Examiner*—Doug Hutton
*Assistant Examiner*—N Hillery
(74) *Attorney, Agent, or Firm*—Finnegan, Henderson, Farabow, Garrett & Dunner LLP (57) ABSTRACT

Systems and methods for defining a form with a plurality of layout items for data presentation by a business application provide a tree view with tree nodes to represent the layout items, wherein the view visualizes structure information, a processing order, a selected tree node to represent a selected layout item; provide a property view to display properties of the selected layout item; provide a layout view to display items, wherein the selected layout item is highlighted; modify the selected layout item and the processing order through interaction with a user; and create a form definition document. The compatibility of layout items and processing order with a predefined data interface of the business application is verified as well.

20 Claims, 7 Drawing Sheets

U.S. PATENT DOCUMENTS

| | | | |
|---|---|---|---|
| 6,161,113 A * | 12/2000 | Mora et al. | 715/505 |
| 6,192,380 B1 | 2/2001 | Light et al. | |
| 6,243,721 B1 * | 6/2001 | Duane et al. | 715/505 |
| 6,345,278 B1 * | 2/2002 | Hitchcock et al. | 707/100 |
| 6,389,434 B1 * | 5/2002 | Rivette et al. | 715/512 |
| 6,460,042 B1 * | 10/2002 | Hitchcock et al. | 707/10 |
| 6,484,149 B1 | 11/2002 | Jammes et al. | |
| 6,490,601 B1 * | 12/2002 | Markus et al. | 715/507 |
| 6,499,041 B1 * | 12/2002 | Breslau et al. | 715/505 |
| 6,519,452 B1 * | 2/2003 | Agostino et al. | 455/423 |
| 6,519,578 B1 * | 2/2003 | Reddy | 706/45 |
| 6,519,617 B1 | 2/2003 | Wanderski et al. | |
| 6,556,975 B1 | 4/2003 | Wittsche | |
| 6,597,381 B1 * | 7/2003 | Eskridge et al. | 715/804 |
| 6,664,986 B1 * | 12/2003 | Kopelman et al. | 715/849 |
| 6,760,490 B1 * | 7/2004 | Zlotnick | 382/311 |
| 6,920,608 B1 * | 7/2005 | Davis | 715/503 |
| 6,968,500 B2 | 11/2005 | Mikhailov et al. | |
| 2002/0129006 A1 * | 9/2002 | Emmett et al. | 707/1 |
| 2005/0080756 A1 | 4/2005 | Hitchcock et al. | |

FOREIGN PATENT DOCUMENTS

| | | |
|---|---|---|
| DE | 4308291 C2 | 9/1994 |
| EP | 0230994 B1 | 8/1987 |
| WO | WO 98/36365 | 8/1998 |
| WO | WO 00/16307 | 3/2000 |

OTHER PUBLICATIONS

"SAP Smart Forms, Form Printing in the Internet Age", 1999, mysap.com, 2 pages.

Jones, D. et al., "Special Edition Using Microsoft Frontpage 2000," Chapter 3-"The Page View: Windows, Icons and Menus," Que Publishing, May 17, 1999, 31 pages.

Marchal, B., "Applied XML Solutions," Chapter 3-"Electronic Forms," Sams Publishing, Aug. 29, 2000, 9 pages.

* cited by examiner

DEFINING FORM FORMATS WITH LAYOUT ITEMS THAT PRESENT DATA OF BUSINESS APPLICATION

FIELD OF THE INVENTION

The present invention generally relates to computer technology, and, more particularly, relates to computers that define formats with layout items to present data of a business application.

BACKGROUND OF THE INVENTION

In a traditional meaning, a "form" is a printed or typed document with blank spaces for insertion of required or requested information. A form is convenient for communication, for example, between a person and an organization. The organization is, for example, a governmental institution or a business enterprise.

Taking an invoice document as an illustrative example, the document is a filled-in form. The form contains a standardized portion for defining name and date fields (i.e. the "form") and a specialized portion for the particular name and particular date.

With the advent of computer technology and the use of computer applications either by the organization or by the person, the term "form" is broadened. As used in this patent application, a "form" stands for any electronic document with predefined format that contains blank fields for filling with data. A "filled-in form" or "final document" is a form where the blank fields are already filled with data.

The organizations use business application programs to organize information flow within the organization or to communicate to and from the organization. Application programs are, for example, programs to assist customer relationship management (CRM), finance management, and human resource management. Although the application programs are different and are often customized to the organization, it is common for most of them that information flow leaving the organization uses the final document on a traditional medium, such as paper.

Often, the final documents are invoices, delivery notes, reminder letters, purchase orders, checks, or customs declarations. For example, an invoice form has pages (e.g., sheets of paper), text areas (e.g., for printing positions to be invoiced, often in tables; greetings to the recipient), an address area (e.g., for printing recipients' address), and a graphic area (e.g., for printing a logotype of the sender).

Form definitions comprise, for example, page breaks, line breaks, fonts indicators, position information, indent, tabulators, protection against line breaks in paragraph, and others.

At a first time point, a form designer (hereinafter "user") creates a new form by a so-called "form builder", a computer program that resembles a commercially available text and image processing program. Logical combinations of layout items are coded by a programming language, thus the user must be familiar with this.

At a second, later time point, an output program reads data from the application program, instantiates the form and prints the final documents. The output program receives the data via a predefined form-interface from the application program.

For creating forms, the following references are useful: U.S. Pat. No. 5,857,034 to Tsuchiya et al.; EP 0230 994 to Muller et al.; DE 4308291C2 to Audi. There is an ongoing need to provide form defining software that alleviates the user from being computer language literate.

SUMMARY OF THE INVENTION

As in claim 1, the present invention relates to a method for defining the format of a form by a computer, the form having pluralities of layout items, the layout items defining the presentation of data of a business application. The method comprises the following steps: providing a logic view with nodes to represent the layout items, the logic view (a) to visualize structure information of the form, (b) to visualize a processing order of the layout items by the position of the nodes, (c) to visualize at least one of the nodes as a selected node to represent a selected layout item; providing a property view to display properties of the selected layout item; providing a layout view to display the layout items, wherein the selected layout item is highlighted; modifying the selected layout item and the processing order through interaction with a user; and creating a form definition document.

Presenting the selection simultaneously in logic, property and layout views assist the user to modify the selected layout item while looking at the place of the item in the structure and looking at the visual appearance of the item. Coding in a program language is not required. Preferably, the steps are performed in a graphical user interface.

As in claim 2, preferably, in step providing the logic view, the logic view is provided as a tree view and the nodes are tree nodes so that the processing order is visualized by a root node, a plurality of branch nodes, and a plurality of leave nodes.

The tree view with the tree nodes is a convenient technical representation of the processing order that is easily understood by the user.

As in claim 3, preferably, in step providing the logic view, the plurality of branch nodes comprise condition nodes to process layout items depending on logical statements in the nodes.

In other words, nodes are optionally processed depending on logical statements. Logical operations that are assigned to the tree nodes are, for example, logical AND-operation and OR-operations; logical operands are constants and other mathematical expressions.

As in claim 4, preferably, modifying the processing order through interaction comprises to change the position of the tree nodes.

The user simply changes the order of the nodes without changing any coding in a programming language. This feature is convenient to save training efforts for the user.

As in claim 5, preferably, in the steps providing the logic view, providing the property view and providing the layout view are performed for a graphical user interface on a single screen.

It is an advantage that the views are provided on the same screen. This allows the user to get an instant overview.

As in claim 6, preferably, the step modifying comprises to verify the compatibility of layout items and processing order with a predefined data interface of the business application.

Verifying compatibility and compliance with the predefined interface alleviates the user from constantly looking up in interface specifications. Noncompliant modifications are not allowed. Training efforts for the users are reduced.

As in claim 7, preferably, a form printing program is generated from the form definition document, the form printing program is called by the business application to print the final document.

As in claim 8, preferably, a computer defines the format of a form, the form has a plurality of layout items, the layout items define the presentation of data of a business application, the computer comprises: a display for providing a tree view with tree nodes to represent the layout items, the tree view (a)

to visualize structure information of the form, (b) to visualize a processing order of the layout items by the position of the tree nodes, (c) to visualize at least one of the tree nodes as a selected node to represent a selected layout item; for providing a property view to display properties of the selected layout item, the properties with logical statements for conditionally processing the items; for providing a layout view to display the layout items, wherein the selected layout item is highlighted; interaction means for modifying the selected layout item and the processing order through interaction with a user who changes the position of the tree nodes; and storing means for creating a form definition document.

As in claim 9, preferably, the computer further comprises verification means to verify the compatibility of layout items and processing order with a predefined data interface of the business application.

As in claim 10, a computer program product has computer program code instructions for defining the format of a form, the form has layout items to define data presentation of a business application, the computer program instructions cause a processor to execute the following steps: providing a logic view with nodes to represent the layout items, the logic view (a) to visualize structure information of the form, (b) to visualize a processing order of the layout items by the position of the nodes, (c) to visualize at least one of the nodes as a selected node to represent a selected layout item; providing a property view to display properties of the selected layout item; providing a layout view to display the layout items, wherein the selected layout item is highlighted; modifying the selected layout item and the processing order through interaction with a user; and creating a form definition document.

As in claim 11, preferably, the computer program code instructions cause the processor to execute the step providing logic view such that the logic view is provided as a tree view that visualizes the processing order by a root node, a plurality of branch nodes, and a plurality of leave nodes.

As in claim 12, preferably, the computer program code instructions cause the processor to execute the step providing logic view such that the plurality of branch nodes comprise condition nodes to process layout items depending on logical statements in the nodes.

As in claim 13, preferably, the computer program code instructions cause the processor to execute the step modifying the processing order through user interaction to change the position of tree nodes.

As in claim 14, preferably, the computer program code instructions causes the processor to execute the steps providing logic view, providing property view and providing layout view are performed for a graphical user interface on a single screen.

As in claim 15, preferably, the computer program code instructions cause the processor to execute the step modifying such to verify the compatibility of layout items and processing order with a predefined data interface of the business application.

DETAILED DESCRIPTION OF THE PREFERRED EMBODIMENTS

For convenience, a list of reference signs is provided prior to the claims.

Figure 1:
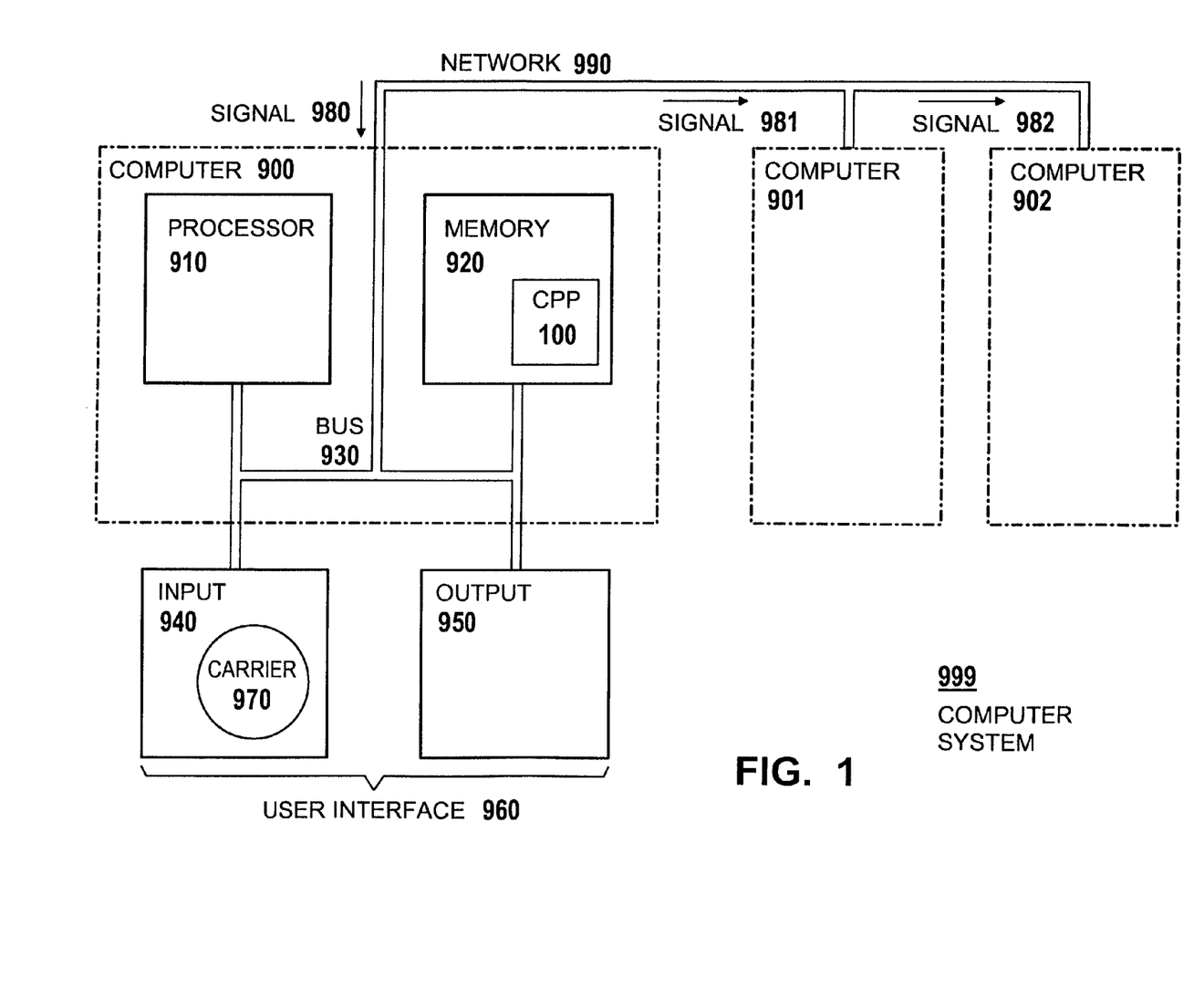
FIG. 1 illustrates a simplified block diagram of a computer network system having a plurality of computers.

FIG. 1 illustrates a simplified block diagram of the computer network system 999 having a plurality of computers 900, 901, 902 (or 90q, with q=0 ... Q-1, Q any number).

Computers 900-902 are coupled via intercomputer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements $10q$ and $91q$-$98q$ (shown for q=0) in computers $90q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory functions can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk - DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in system network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or other type of display, (cathode ray tube (CRT), flat panel display, liquid crystal display (LCD), a speaker, a printer, a plotter, a vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are know, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
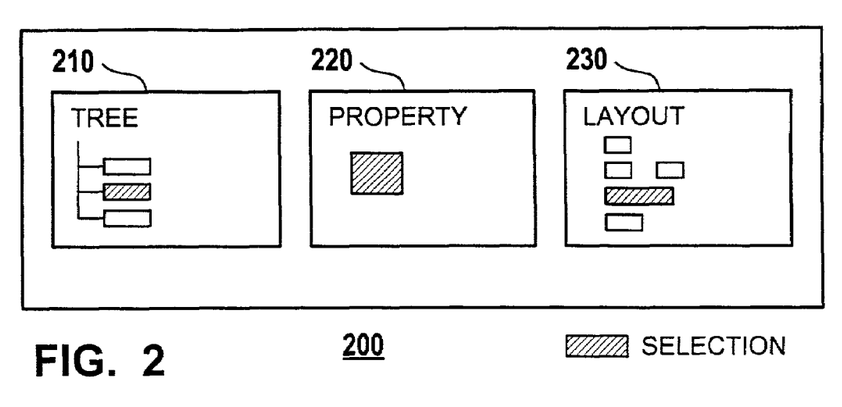
FIG. 2 illustrates a simplified screen diagram of a graphical user interface with a tree view, a property view, and a layout view according to the present invention.

FIG. 2 illustrates a simplified screen diagram of graphical user interface 200 with tree view 210 (TREE"), property view 220 (PROPERTY"), and layout view 230 ("LAYOUT") according to the present invention. Generally, tree view 210 is a logic view. Details for each view are presented in FIGS. 3-5, respectively.

Throughout further illustrations, selecting and highlighting is illustrated by hatching. It is known in the art that the user can select an object on a screen, for example, by double-clicking with a mouse, by pressing predefined keys, or otherwise. Usually, the object that is selected is also highlighted.

Conveniently, graphical user interface has tree view 210 on the left side of display 950 (cf. FIGS. 1, 9), property view 220 in the center, and layout view 230 on the right side.

Figure 3:
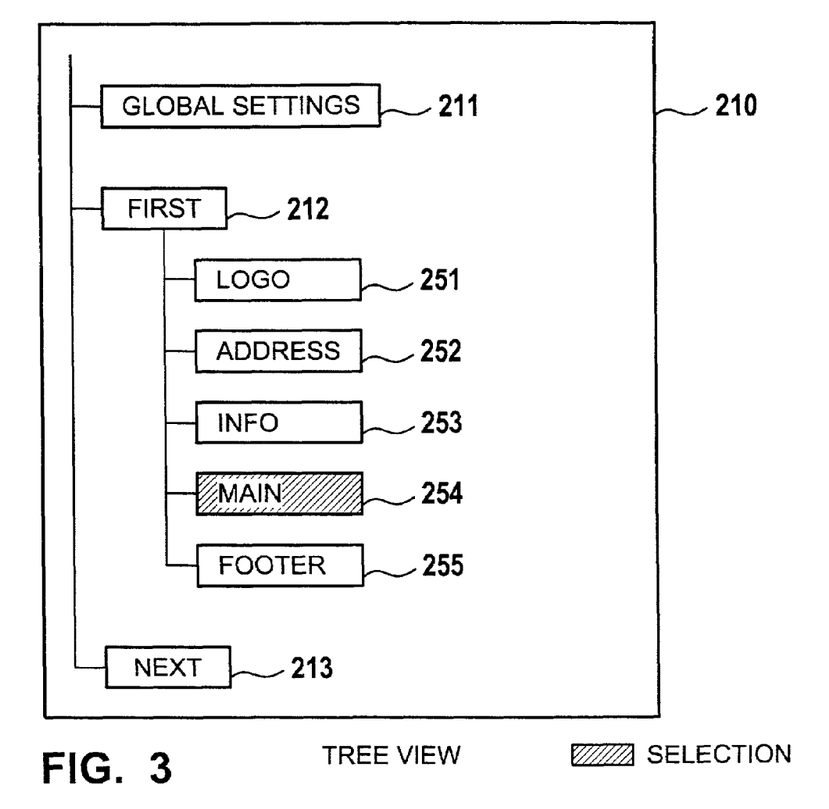
FIG. 3 illustrates a simplified screen diagram of the tree view of FIG. 2 with tree nodes, wherein a node is being selected.

FIG. 3 illustrates a simplified screen diagram of tree view 210 of FIG. 2 with tree nodes 211-213 and 251-255. Node 211 at top position stands for global settings of the form. Node 212 at center position has further nodes 251-255 with labels to visualize further structure information: node 251 for a logotype at a predetermined position in the form ("LOGO"), node 252 for an address ("ADDRESS"), node 253 for further information ("INFO"), node 254 for a main text ("MAIN"), and node 255 for further information in the lower part of the form ("FOOTER"). The labels of nodes 251-255 correspond to functions (structure) of items 351-355 (cf. FIG. 5), respectively. In the invoice example, the filled-in form (i.e. final document) has a logotype with a bitmap symbol of the sender, a main portion with a table, the recipients' address, and the footer stating the bank account number of the sender. Node 213 at the lower position stands for further processing ("NEXT"), not relevant to the present invention.

Figure 5:
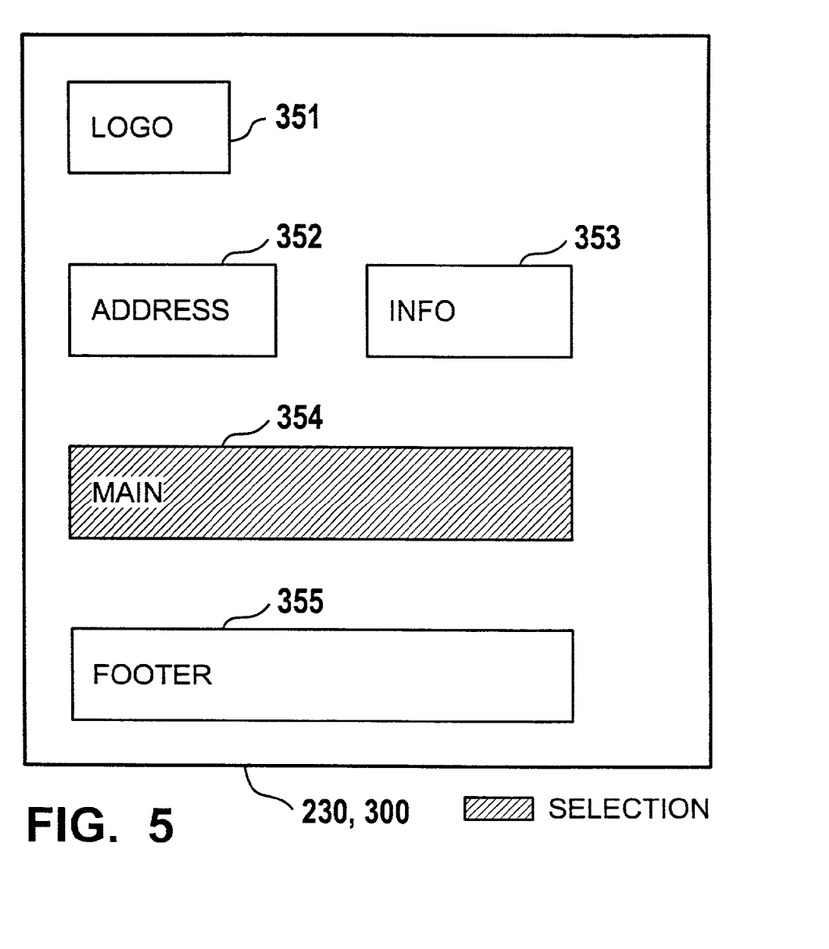
FIG. 5 illustrates a simplified screen diagram of the layout view, the layout item for the selected node of FIG. 3 being highlighted.

Among the nodes, nodes 251-255 correspond to layout items (cf. FIG. 5). Node 254 is being selected (hatched). Tree view 210 is a tool that assists the user to navigate within the form as explained in the following.

Figure 4:
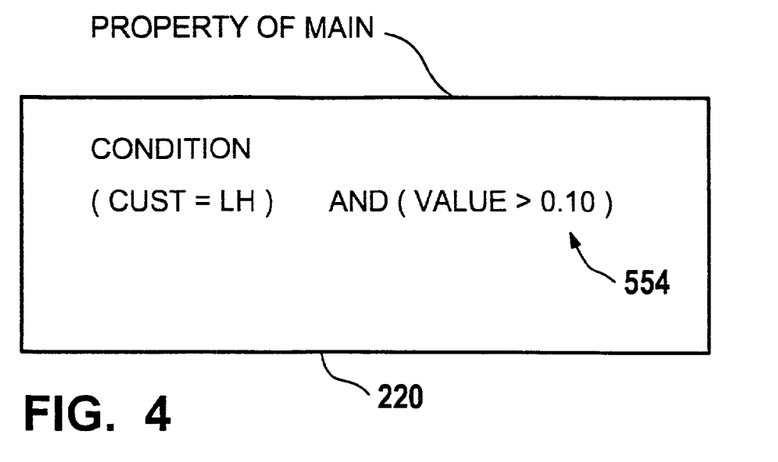
FIG. 4 illustrates a simplified screen diagram of the property view, properties for the selected node of FIG. 3 being displayed.

FIG. 4 illustrates a simplified screen diagram of property view 220. Properties for selected node 254 "MAIN" of FIG. 3 are displayed. For example, the form prints invoice details only if customer is identified as "LH" and if a monetary value exceeds 0.10 currency units. In other words, property view 220 indicates logical statement 554 for processing the layout item that is identified by selected node 254.

FIG. 5 illustrates a simplified screen diagram of layout view 230 in that layout item 354 for the selected node 254 of FIG. 3 is highlighted. The user arranges the layout items by a layout and texts editor; the editors can display toolbars, grid lines, rulers, zoom lenses, spell checker or other convenient editing means; such editors are well known in the art and therefore not further described.

Layout view 230 is a pre-view and corresponds to form 300 being to be provided by output device 551. According to the present invention, any selecting by user is forwarded to the other view. In does not matter whether the user selects a node in view 210 or a layout item in view 230. Selection is effective in all 3 views 210-230.

Taking FIG. 5 as an illustrative example, persons of skill in the art are able, based on the description herein, to alter the number of layout items. Optionally, the layout items can be tables, such as in an invoice.

Figure 6:
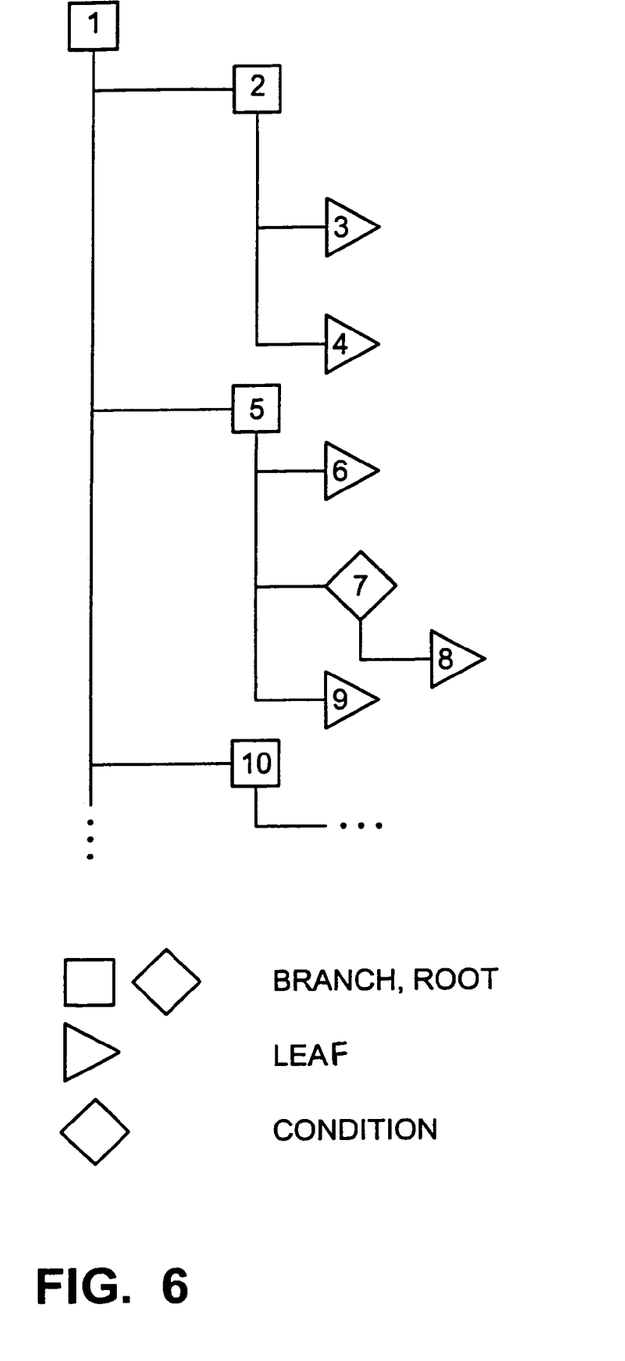
FIG. 6 illustrates a simplified screen diagram of the tree view of FIG. 3 with tree nodes arranged in hierarchy.

FIG. 6 illustrates a simplified screen diagram of tree view 210 of FIG. 3 with tree nodes arranged in hierarchy. Arabic numbers indicate a preferred processing order 1 to 10. The user has defined the order by a hierarchy. Nodes that have successors are indicated by square and diamond symbols; nodes that do not have successors are indicated by triangle symbols.

The nodes in FIG. 6 are: a root node ("primary"node, square 1); a plurality of branch nodes ("secondary"node, squares 2, 5, 10 and diamond 7); and a plurality of leaf nodes, "terminal"node triangles 3, 4, 6, 8, 9).

In other words, the tree nodes are shaped according to their function. The optional continuation of tree 210 is represented by ellipsis (". . .").

Figure 7:
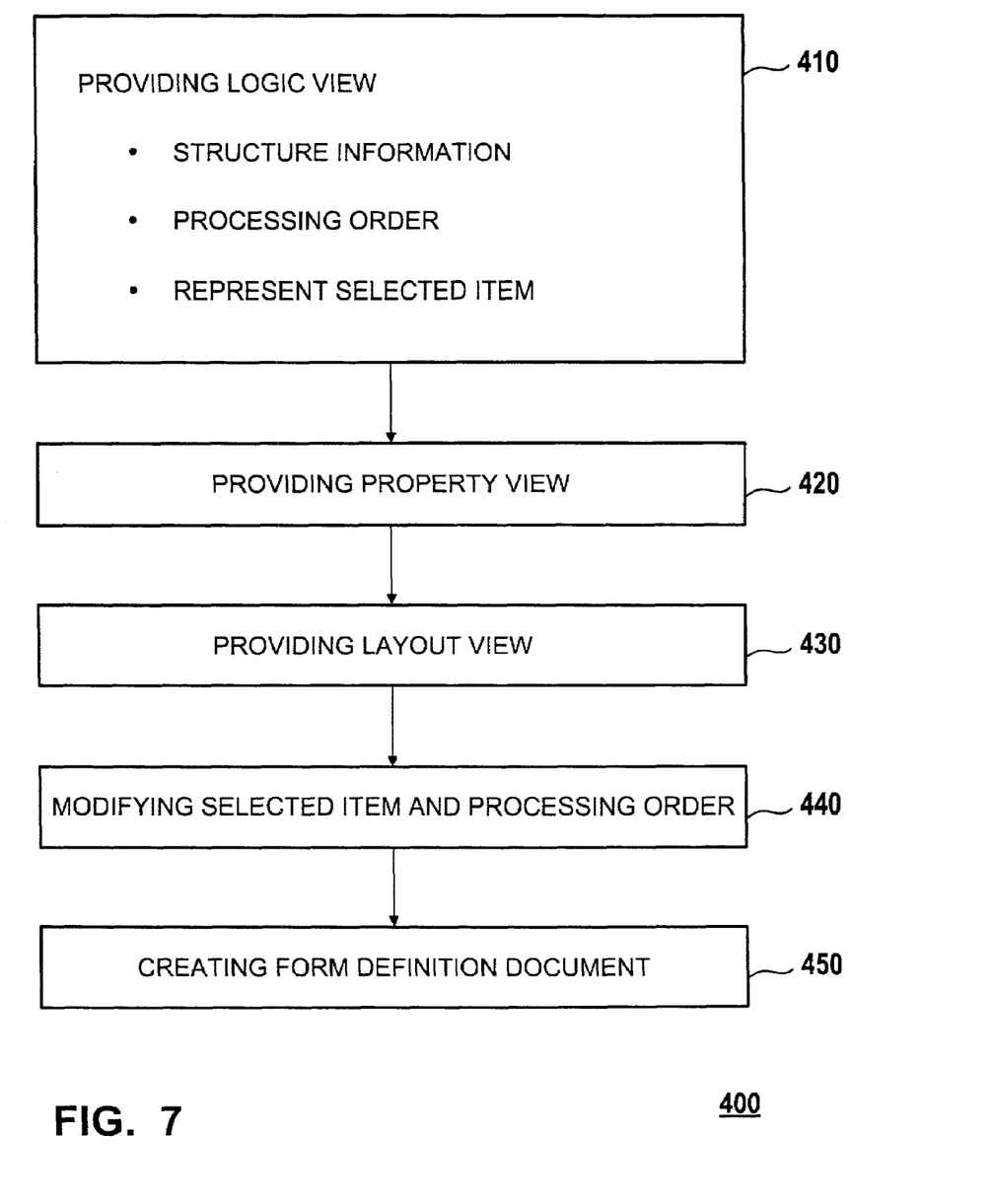
FIG. 7 illustrates a simplified flow chart diagram of a method according to the present invention.

FIG. 7 illustrates a simplified flow chart diagram of method 400 according to the present invention.

Method 400 is a method for defining the format of form 300 (cf. FIG. 5) by computer 900 (cf. FIGS. 1, 9), form 300 having pluralities of layout items 351-355 that define the presentation of data of a business application. Method 400 comprises the following steps: providing 410 logic view, providing 420 property view, providing 430 layout view, modifying 440 selected layout item, and creating 450 form definition document. For convenience of explanation, it is assumed that method 400 is performed by design computer 900 (cf. FIGS. 1, 9) controlled by computer program product 100.

In step providing 410 logic view (with nodes 211-213 and 251-255 to represent layout items 351-355), computer 900 provides view 210 to (a) to visualize structure information of form 300, (b) to visualize the processing order of layout items 351-355 by the position of nodes 211-213 and 251-255 (details in FIG. 6), and (c) to visualize at least one of nodes 211-213, 251-255 as selected node 254 (cf. FIG. 3) to represent selected layout item 354 (cf. FIG. 5). In step providing 420 property view, computer 900 provides property view 220 to display properties of the selected layout item 354, as explained in the example of FIG. 4. In step providing 430 layout view, computer 900 provides layout view 230 to display layout items 351-355, wherein selected layout item 354 is highlighted. In step modifying 440 selected layout item and processing order, computer 900 modifies selected layout item 354 or processing order 1-10 (cf. FIG. 6) through interaction with the user. In step creating 450 form definition document 301, computer 900 stores layout information confirmed in the previous steps in document 301 (cf. FIG. 9). Preferably, in step creating 450, data objects are stored in a programming language according to predefined rules (e.g., XML rules).

As illustrated in connection with FIG. 3, preferably, in step providing 410 logic view, the view is provided as tree view 210 and the nodes are tree nodes. As in FIG. 6, processing order 1-10 is visualized by root node 1, a plurality of branch nodes 2, 5, 7, and a plurality of leave nodes 3, 4, 6, 8, and 9.

Preferably, in step providing 410 logic view, computer 900 visualizes structure information by labels (LOGO 251, ADDRESS 252, INFO 253, MAIN 254, FOOTER 255) at the nodes that correspond to functions of items 351-355.

When form definition document 301 (cf. FIG. 9) has been created, a form printing program is generated from document 301. The form printing program is called by the business application to print the final document.

Figure 8A:
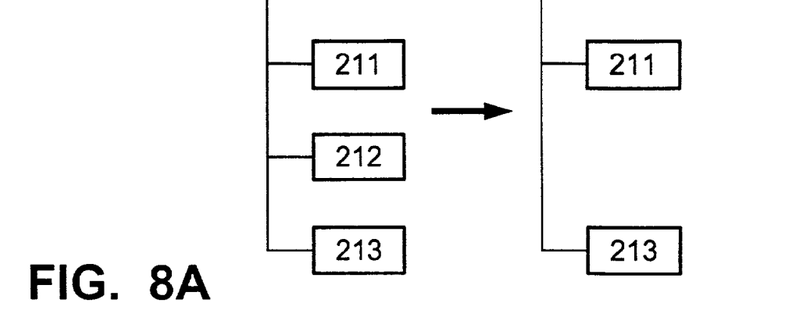
FIG. 8 illustrates a further method step of modifying a processing order by illustration of tree node positions.
Figure 8B:
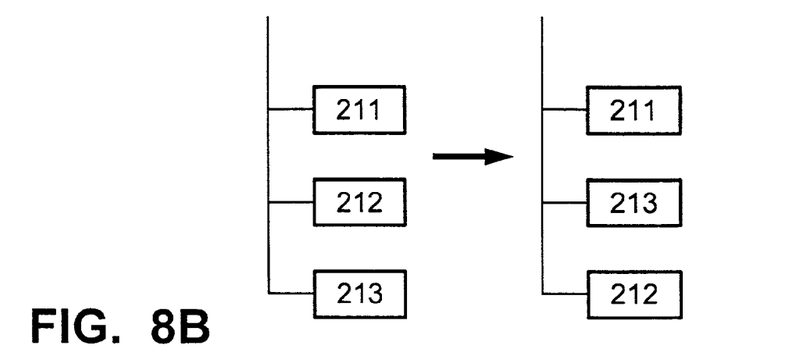
Figure 8C:
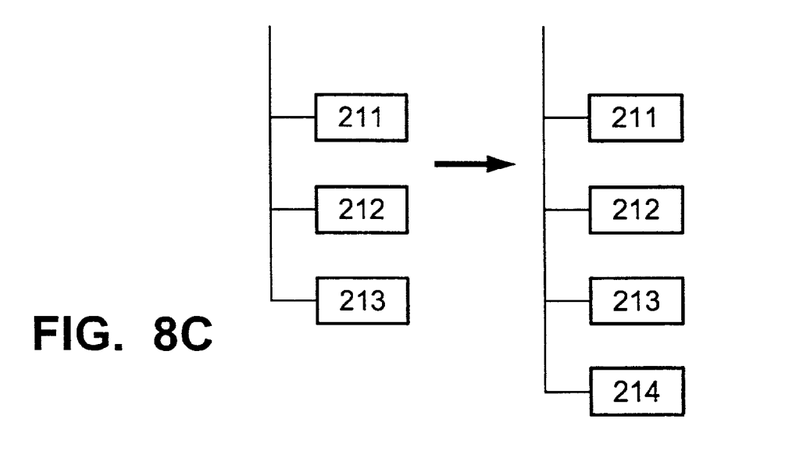

FIG. 8 illustrates method step modifying 440 processing order 1-10 by illustration of tree node positions. FIGS. 8A to 8C illustrate on the left sides the positions of tree nodes 211-213 before modifying (order 211, 212, 213), and illustrate on the right sides the positions of tree nodes after modifying. The processing order is changed when a tree node is removed (A), added (B) or shifted (C).

As in FIG. 8A, removing node 212 ("REMOVE") leads to new order 211, 213. As in FIG. 8B, shifting node 212 ("SHIFT", user drags node 212 down) leads to new order 211, 213, 212. As in FIG. 8C, adding node 214 ("ADD"), the user adds node 214, for example, by invoking a "new" command or by copying node 214 from the clipboard order changes to 211, 212, 213, 214. The "clipboard" stands for any intermediate storage means for cutting, copying and pasting.

Figure 9:
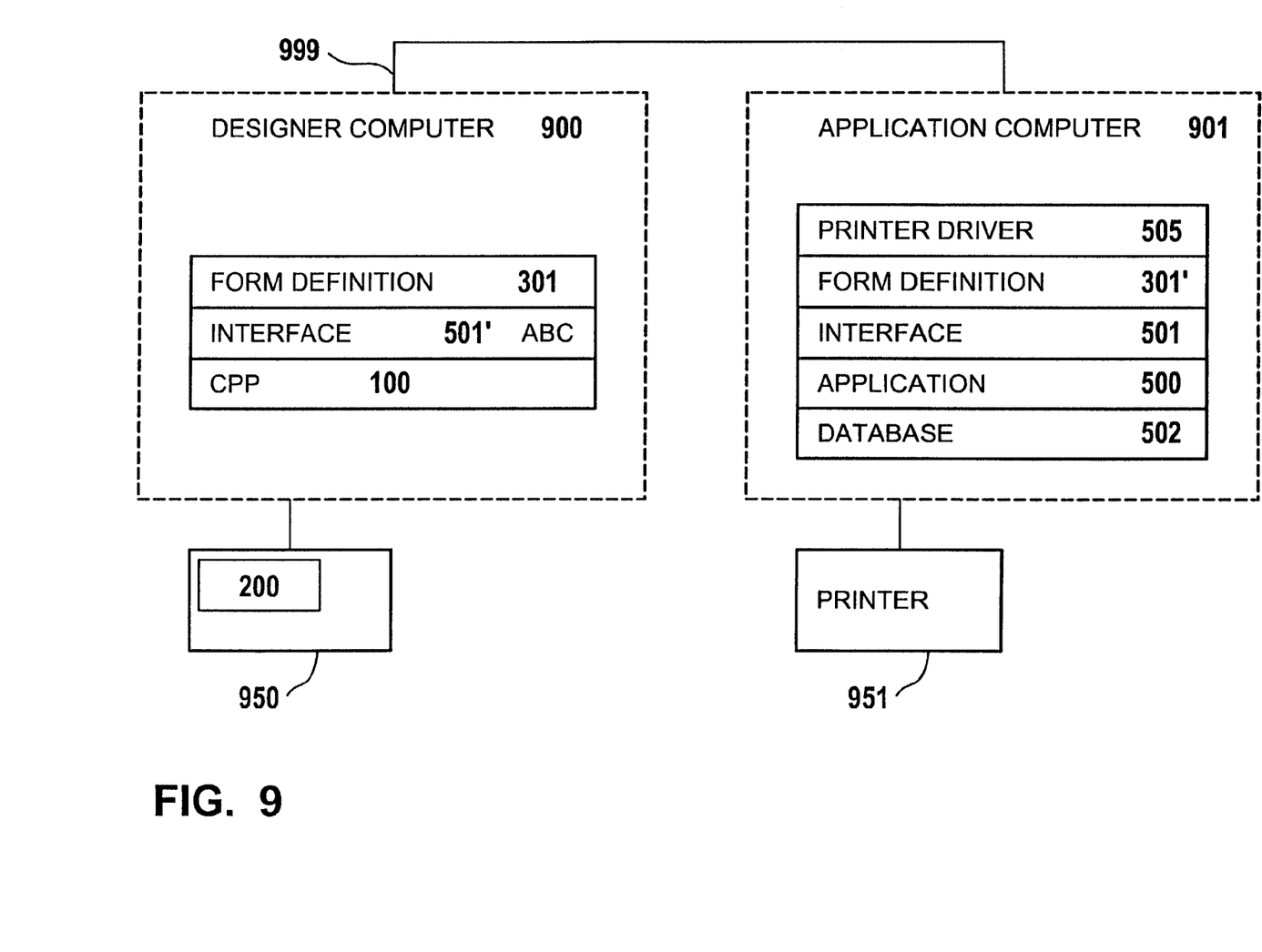
FIG. 9 illustrates a simplified block diagram of the computer network system with a design computer and an application computer.

FIG. 9 illustrates a simplified block diagram of computer network system 999 (cf. FIG. 1) with design computer 900 and application computer 901. FIG. 9 is an example for conveniently explaining a preferred system configuration; those of skill in the art configure it otherwise without departing from the scope of the present invention.

Design computer 900 performs method 400 (cf. FIG. 7) by computer program product 100 of the present invention. Design computer 900 communicates with the user via display 950 that renders graphical user interface 200 (cf. FIG. 2). As a result, computer 900 provides form definition document 301.

Application computer 901 performs business application 500 and printer driver 505. Application 500 accesses database 502 and forwards data to driver 505 via data interface 501. By merging data with form definition document 301' (e.g., a copy of 301), printer driver 505 prints final documents to printer 951. Conveniently, "printer" stands for any device selected from the group of printer, facsimile machine, email document, web publishing document.

Interface 501 allows to forwards data of predefined types. FIG. 9 identifies the types by letters as type A, type B and type C. According to the present invention, a copy 501' of interface 501 makes the type definitions available to program 100. In step modifying 440 (cf. FIG. 7), program 100 verifies the compatibility of layout items and processing order with interface 501 of application 500. For example, if the user request to add (to definition document 301) a layout item that does not corresponds to types A, B or C, adding the item is prevented. Optionally, the verification comprises a syntax check (e.g., for statement 554).

Optionally, design computer 900 creates form printing program (not illustrated) from the form definition document 301, the form printing program being called in computer 901 by business application 500 to print the final document.

Having described details, the present invention is summarized as computer 900 for defining format of form 300, form 300 having a plurality of layout items 351-355, the layout items defining a presentation of data of business application 500, computer 900 comprises: display 950 for providing 410 tree view 210 with tree nodes 211-213, 251-255 to represent layout items 351-355, tree view to visualize structure information of form 300, to visualize a processing order of layout items 351-355 by position of tree nodes 211-213, 251-255, to visualize at least one of tree nodes 211-213, 251-255 as selected node 254 to represent selected layout item 354; for providing 420 property view 220 to display properties of selected layout item 354, properties with logical statements 554 for conditionally processing items; for providing 430 layout view 230 to display layout items 351-355, wherein selected layout item 354 is highlighted; interaction means 940 for modifying 440 selected layout item 354 and the processing order through interaction with a user who changes the position of tree nodes 211-213; and storing means 920 for creating 450 form definition document 301.

Preferably, computer 900 comprises verification means to verify the compatibility of the layout items and the processing order with predefined data interface 501 of business application 500.

The present invention is also summarized by computer program product 100 having computer program code instructions for defining the format of form 300, form 300 having layout items 351-355 to define data presentation of a business application 500, the computer program instructions causing processor 910 to execute following steps: providing 410 logic view 210 with nodes 211-213, 251-255 to represent layout items 351-355, logic view to visualize structure information of form 300, to visualize a processing order of layout items 351-355 by the position of nodes 211-213, 251-255, to visualize at least one of nodes 211-213, 251-255 as selected node 254 to preprepent a selected layout item 354; providing 420 property view 220 to display properties of selected layout item 354; providing 430 layout view 230 to display layout items 351-355, wherein selected layout item 354 is highlighted; modifying 440 selected 354 item and the processing order through interaction with a user; and creating 450 form definition document 301. Preferably, the computer program code instructions cause processor 910 to execute the as described above.

| List of References | |
|---|---|
| Reference | Element |
| 1-10 | processing order |
| 1 | root node |
| 2, 5, 7 | branch nodes |
| 3, 4, 6, 8, 9 | leave nodes |
| 7 | condition node |
| 200 | graphical user interface |
| 210 | tree view |
| 211—213, 251-255 | nodes |
| 220 | property view |
| 230 | layout view |
| 254 | selected node |
| 300 | form |
| 301 | form definition document |
| 351-355 | layout items |
| 354 | selected layout item |
| 400 | method |
| 410 | providing logic view |

| -continued | |
|---|---|
| List of References | |
| Reference | Element |
| 420 | providing property view |
| 430 | providing a layout view |
| 440 | modifying |
| 450 | creating |
| 500 | business application |
| 501 | data interface |
| 502 | database |
| 505 | printer driver |
| 554 | logical statement |
| 900 | design computer |
| 901 | application computer |
| 940 | input device |
| 950 | display |
| 951 | printer |
| 970 | carrier |
| 999 | computer network system |

The invention claimed is:

1. A computer-implemented method for creating a form including a plurality of layout items that define the presentation of data, said method comprising:
    displaying simultaneously a logic view, a property view, and a form layout view,
        the logic view including nodes representing the layout items and display labels, associated with the nodes,
            the nodes in the logic view having an order that corresponds to structure information of the layout items in the layout view,
        the order of the nodes defining a processing order of the layout items,
    the property view displaying properties of the layout items, and
    the form layout view displaying a representation of the form that provides a preview of the location of the layout items in the form
        wherein each of the layout items contains a label that summarizes the information to be entered into the layout item, and
        wherein the label for each of the layout items in the layout view contains wording different from wording used in the form sent to an output device;
    selecting a layout item in one of the logic, property, and form layout views;
    continuously displaying and continuously highlighting the layout item as selected in one of the views other than the view in which the layout item was selected for the entire time that the layout item is selected;
    modifying the selected layout item in one of the views; and
    creating a form definition document based on the modified selected layout item.

2. The method of claim 1, further comprising:
    reflecting the modifications to the selected layout item in one of the views in which the modification was not made.

3. The method of claim 2, wherein modifying the selected layout item comprises:
    modifying the order of layout items in the logic view, thereby changing the processing order.

4. The method of claim 1, wherein the logic view comprises a tree view, and wherein the nodes are tree nodes.

5. The method of claim 4, wherein the tree nodes include condition nodes to process layout items according to logical statements.

6. The method of claim 4, wherein the tree nodes are shaped according to their function.

7. The method of claim 1, wherein modifying the selected layout item comprises:
verifying the compatibility of the layout items and the processing order with a predefined data interface of a business application.

8. The method of claim 1, wherein creating a form definition document based on the modified selected layout items comprises:
generating a form-printing program; and
calling the form-printing program by a business application to print a final document based on the form definition document; and
obtaining information from one or more databases to be entered into one or more of the layout items after calling the form-printing program.

9. The method of claim 1, wherein selecting a layout item in one of the logic, property and form layout views further comprises: highlighting the selected layout item in at least one additional view.

10. The method of claim 1, wherein the nodes are shaped according to their function.

11. The method of claim 1, further including obtaining information from one or more databases to be entered into one or more of the layout items after calling a print driver.

12. A system for defining the format of a form having a plurality of layout items defining the presentation of data of a business application, said system comprising:
a display for simultaneously providing a logic view, a property view, and a form layout view,
the logic view including nodes representing the layout items and display labels, associated with the nodes,
the nodes in the logic view having an order that corresponds to structure information of the layout items in the layout view,
the order of the nodes defining a processing order of the layout items,
the property view displaying properties of the layout items, and
the form layout view displaying a representation of the form that provides a preview of the location of the layout items in the form
wherein each of the layout items contains a label that summarizes the information to be entered into the layout item, and
wherein the label for each of the layout items in the layout view contains wording different from wording used in the form sent to an output device;
interaction means for receiving an input from a user selecting a layout item in one of the logic, property, and form layout views and modifying the selected layout item;
display means for continuously displaying and continuously highlighting the layout item as selected in one of the views other than the view in which the layout item was selected for the entire time that the layout item is selected; and
storing means for creating a form definition document from the modified layout item.

13. The system of claim 12, further comprising
verification means to verify the compatibility of the layout items and the processing order with a predefined data interface of the business application.

14. The system of claim 12, wherein the nodes are shaped according to their function.

15. A computer readable storage medium storing instructions that, when executed by a computer, cause the computer to perform a method for creating a form including a plurality of layout items that define the presentation of data, the method comprising:
displaying simultaneously a logic view, a property view, and a form layout view,
the logic view including nodes representing the layout items and display labels, associated with the nodes,
the nodes in the logic view having an order that corresponds to structure information of the layout items in the layout view,
the order of the nodes defining a processing order of the layout items,
the property view displaying properties of the layout items, and
the form layout view displaying a representation of the form that provides a preview of the location of the layout items as the layout items will appear in the form,
wherein each of the layout items contains a label that summarizes the information to be entered into the layout item, and
wherein the label for each of the layout items in the layout view contains wording different from wording used in the form sent to an output device;
showing a layout item as selected in one of the logic, property, and form layout views in which the item was selected;
continuously displaying and continuously highlighting the layout item as selected in one of the views other than the view in which the layout item was selected for the entire time that the layout item is selected;
modifying a selected layout item and the processing order through interaction with a user; and
creating a form definition document from the modified layout item.

16. The computer readable storage medium of claim 15, wherein the instructions further include providing the logic view as a tree view showing the processing order, the tree view including a root node, a plurality of branch nodes, and a plurality of leaf nodes.

17. The computer readable storage medium of claim 16, wherein the instructions further include providing the logic view showing a branch node as a condition node to process the layout items based on logical statements.

18. The computer readable storage medium of claim 16, wherein the computer program code instructions further include
modifying the processing order through user interaction to change a position of tree nodes.

19. The computer readable storage medium of claim 16, wherein the instructions further include verifying a compatibility of the layout items and the processing order with a predefined data interface of the business application.

20. The computer readable storage medium of claim 15, wherein the nodes are shaped according to their function.

* * * * *